United States Patent [19]
Johten et al.

[11] Patent Number: 5,122,296
[45] Date of Patent: Jun. 16, 1992

[54] FERROELECTRIC LIQUID CRYSTAL COMPOSITION AND LIQUID CRYSTAL DISPLAY DEVICE

[75] Inventors: Kazuhiro Johten, Hirakata; Tsuyoshi Uemura, Kadoma; Hiroyuki Onishi, Ikeda; Hideaki Mochizuki, Osaka; Hiroshi Satani, Neyagawa, all of Japan

[73] Assignee: Matsushita Electric Industrial Co., Ltd., Osaka, Japan

[21] Appl. No.: 422,493

[22] Filed: Oct. 17, 1990

[30] Foreign Application Priority Data

Oct. 19, 1988 [JP] Japan .................. 63-263230
Dec. 5, 1988 [JP] Japan .................. 63-307389

[51] Int. Cl.⁵ .................. C09K 19/54; C09K 19/52
[52] U.S. Cl. .................. 252/299.5; 252/299.01
[58] Field of Search ............ 252/299.01, 299.3, 299.5, 252/299.6, 299.61, 299.62, 299.63, 299.64, 299.65, 299.66, 299.67, 299.68

[56] References Cited

U.S. PATENT DOCUMENTS 4,769,448  9/1988  Heeger et al. .................. 252/299.01
4,970,022  11/1990 Scheuble et al. .................. 252/299.01

FOREIGN PATENT DOCUMENTS 0263437   4/1988  European Pat. Off. .
292954   11/1988  European Pat. Off. .
0352637   1/1990  European Pat. Off. .
2758317   6/1978  Fed. Rep. of Germany .
60-22034   5/1985  Japan .
63-39632   8/1988  Japan .
8701822   3/1987  PCT Int'l Appl. .

OTHER PUBLICATIONS

Lochmüller et al., Journal of Chromatography, (1979), vol. 178, pp. 411-417.
Bialecka-Florjanczyk, Molecular Crystals and Liquid Crystals+Letters, vol. 82, No. 7, 1982, pp. 243-246.
Optronics (1983), No. 9.

Primary Examiner—Robert L. Stoll
Assistant Examiner—Philip Tucker
Attorney, Agent, or Firm—Wenderoth, Lind & Ponack

[57] ABSTRACT

This invention prevents a time-course deterioration of characteristics of a liquid crystal panel and dramatically increases the life of the panel by using a ferroelectric liquid crystal composition in which a proper amount of aliphatic amine or epoxy compound is added to a ferroelectric liquid crystal material.

7 Claims, 3 Drawing Sheets

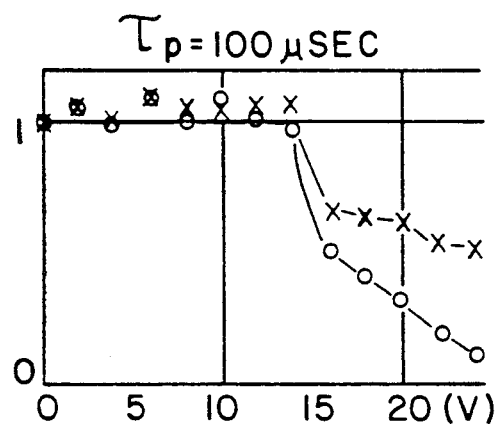
FIG. 2(a)1
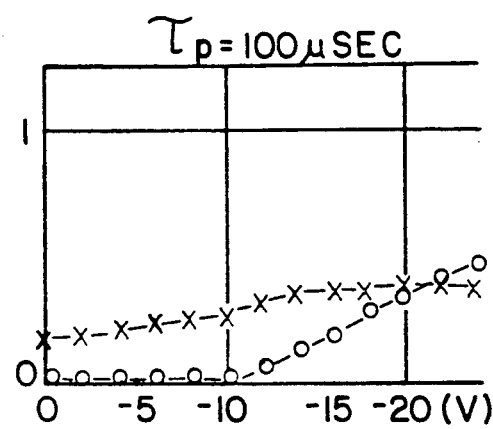
FIG. 2(a)2
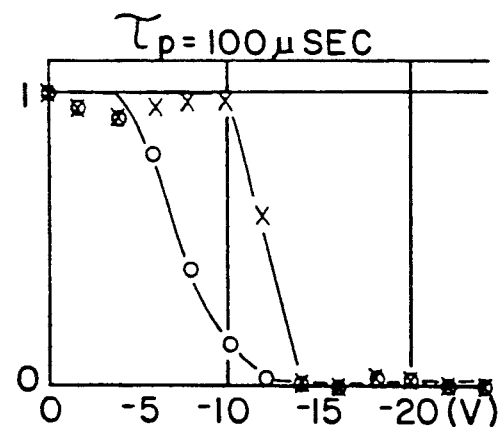
FIG. 2(b)1
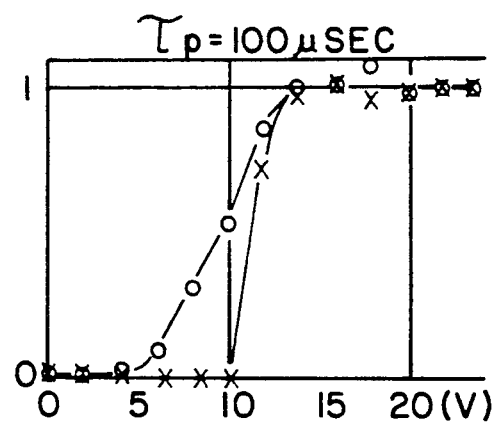
FIG. 2(b)2

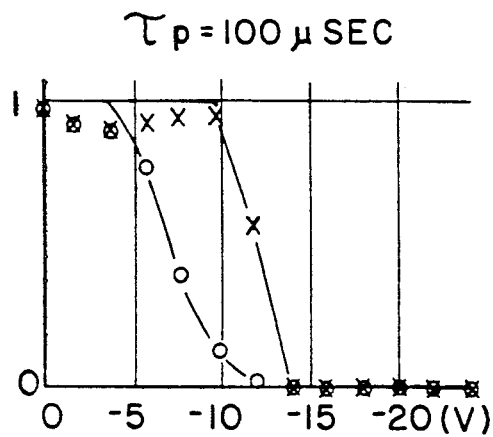
FIG. 3(a)1
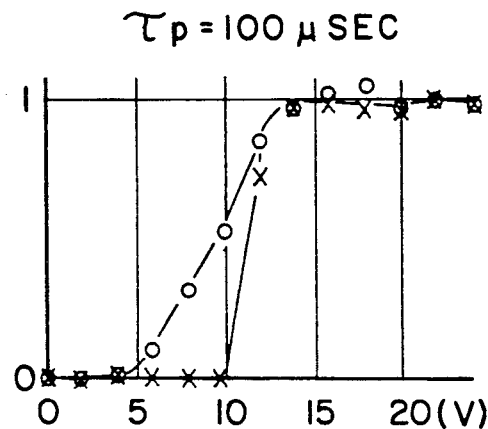
FIG. 3(a)2
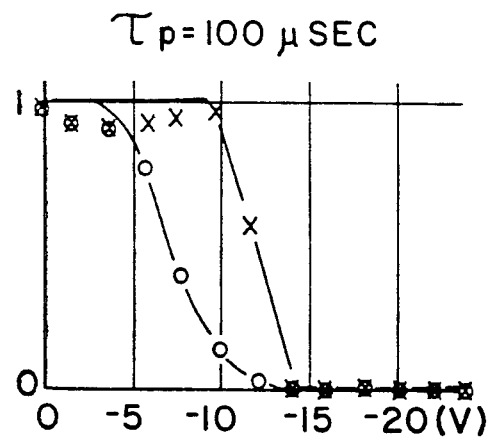
FIG. 3(b)1
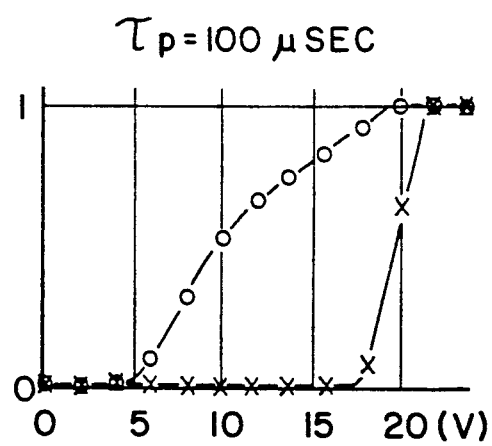
FIG. 3(b)2

FERROELECTRIC LIQUID CRYSTAL COMPOSITION AND LIQUID CRYSTAL DISPLAY DEVICE

BACKGROUND OF THE INVENTION

1. Field of the Invention

This invention relates to a liquid crystal display device, and more particularly to a ferroelectric liquid crystal composition and a ferroelectric liquid crystal display device.

2. Description of the Prior Art

Recently liquid crystal displays are used not only in watches and pocket calculators but also in a wide range of image display equipment including color televisions. Nematic liquid crystal is mainly used in the liquid crystal color displays. The nematic liquid crystal, however, has characteristics which are far from the ideal, and has a number of problems. The ferroelectric liquid crystal has characteristics such as a speedy response and a memory capability which are not possessed by the nematic liquid crystal, and has been studied in many aspects for use in display devices (Optronics, 1983, No. 9), while a practical use has not been realized yet. One of the reasons is that the bistability and the threshold characteristic deteriorate as time passes, causing a problem that superior initial characteristics can not be maintained.

In FIG. 3, a time-dependent deterioration of the threshold characteristic is shown. The cell gap is 2 μm. A mark O shows the maximum relative brightness when a voltage is applied, which is a bulk response, and a mark X shows a relative brightness after scanning 1,000 lines of a series of measurement waveforms, which is a memory response. FIG. 3(a)1 and 3(a)2 shows a threshold characteristic immediately after the injection of liquid crystal, in which an acute threshold characteristic and a superior bistability are shown. In FIG. 3(b)1 and 3(b)2 is shown a result of experimentally studying a time-dependent deterioration of a liquid crystal panel having such a superior initial characteristic. In FIG. 3(b)1 and 3(b)2, which shows a threshold characteristic after 200 hours have passed, thresholds become asymmetric in comparison with FIG. 3(a)1 and 3(a)2, and as longer time passes, it was recognized that the asymmetricity tended to grow to be monostable. Therefore, for a practical use, a long-term stability of the characteristic is an essential subject.

SUMMARY OF THE INVENTION

An object of the invention is to prevent a time-dependent deterioration of characteristics such as bistability and threshold characteristic of ferroelectric liquid crystals.

In order to attain this object, the invention provides a ferroelectric liquid crystal composition which contains an aliphatic amine or an epoxy compound.

By this composition, a time-dependent deterioration of characteristics can be eliminated and the life of the panel characteristics can be dramatically increased.

BRIEF DESCRIPTION OF THE DRAWINGS

FIGS. 2(a)1, 2(a)2, 2(b)1, 2(b)2, 3(a)1, 3(a)2, 3(b)1 and 3(b)2 are diagrams showing threshold characteristics of a ferroelectric liquid crystal compound.

DESCRIPTION OF PREFERRED EMBODIMENTS

Figure 1:
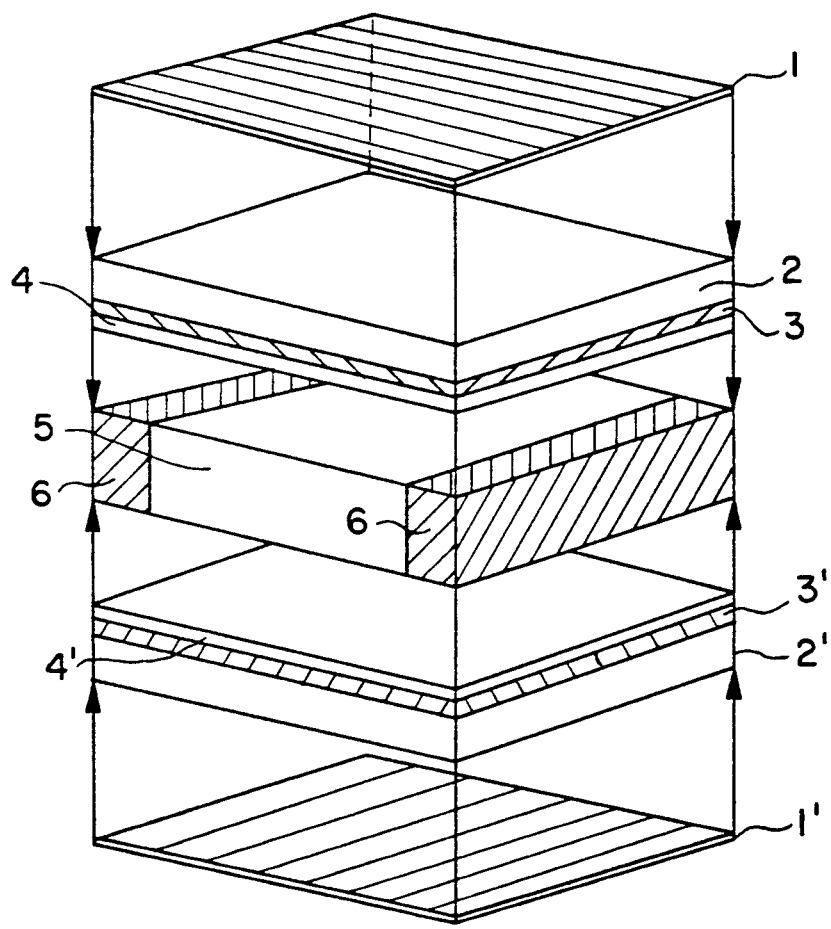
FIG. 1 shows a structure of a ferroelectric liquid crystal cell in an embodiment of the invention.

Referring now to the drawings, an embodiment of the invention is described in details below. FIG. 1 shows a structure of a liquid crystal cell. In this figure, numerals 1 and 1' are polarizers, numerals 2 and 2' are glass substrates, 3 and 3' are transparent electrodes, 4 and 4' are column layers formed by oblique vapor deposition, or organic orientation film layers treated to have a specific orientation, and numeral 5 is a ferroelectric liquid crystal layer containing an aliphatic amine or an epoxy compound. Aliphatic amines which can be used for the invention are primary or secondary aliphatic amines. Tertiary aliphatic amines are not suitable.

A preferable aliphatic amine has a structural formula as shown by Formula I below. In Formula I, $R_1$ and $R_1'$ are —H or hydrocarbon radicals, and $R_2$ is a hydrocarbon radical. Among radicals in $R_2$, a $CH_2$ radical or two or more $CH_2$ radicals which are not adjoining each other may be substituted by at least one member of radicals —O—, —CO—, —OCO— and —COO—. An aliphatic amine having a structural formula as shown by Formula II shows the same effect. In Formula II, $R_3$ is —H or $(CH_2)nOH$ (n is 1 or more), $R_4$ is a $CH_2$ radical. Among radicals in $R_4$, a $CH_2$ radical or two or more $CH_2$ radicals which are not adjoining each other may be substituted by at least one member of radicals —O—, —CO—, —OCO— and —COO—. Preferable aliphatic amines are, for example, Jeffamine (D230 and D400), benzyl amine, benzyl ethanolamine, methyl benzyl amine, phenyl propyl amine, and cyclohexylamine. But, usable compounds are not limited to these. When aromatic amines and tertiary amines are used, the same effect can not be obtained. As the epoxy compounds, preferable compounds are epoxy resins and epoxy compounds composed of glycidyl radical derivatives of which a structural formula is shown by Formula III. In Formula III, $R_5$ is a hydrocarbon radical, wherein a $CH_2$ radical or more than one $CH_2$ radical which are not adjoining each other in the radical $R_5$ may be substituted by at least one member of radicals —O—, —CO—, —OCO— and —COO—. The amount of amine added to the liquid crystal may not be specifically limited, but, practically, an amount of 0.01 to 5 wt% is prefereable. Numeral 6 shows a spacer to specifically maintain a cell thickness.

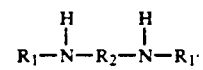

Formula I

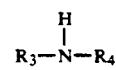

Formula II

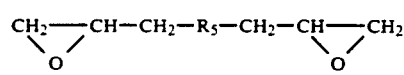

Formula III

FIG. 1 shows a structure of a transparent type liquid crystal cell, and by placing a reflector outside a polarizer 1 or 1' in FIG. 1, it can be used as a reflection-type liquid crystal cell.

EXAMPLE 1

Material characteristic values of a ferroelectric liquid crystal material used for this Example are shown below.

Liquid crystal material: ZLI-3654 (MERCK),

Phase transition temperatures:

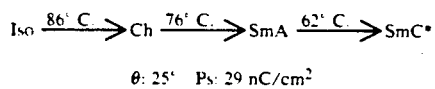

$\theta$: 25°  Ps: 29 nC/cm²

Where
θ: tilting angle.
Ps: spontaneous polarization.
Iso: isotropic liquid crystal phase,
Ch: cholesteric phase,
SmA: smectic A phase,
The liquid crystal is not limited to ZLI-3654.

Below are shown phase transition temperatures when 0.3 wt% of Jeffamine (D230) is added.

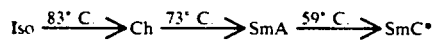

Phase transition temperatures were measured by texture observations through a polarizing microscope and a DSC (differential scanning calorimeter). The structural formula of Jeffamine (D230) is as below.

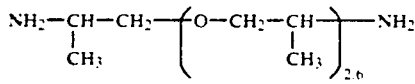

FIG. 2 shows a threshold characteristic of the ferroelectric liquid crystal. FIG. 2(a)1 and 2(a)2 show a threshold characteristic when only ZLI-3654 was injected into a cell. FIG. 2(b)1 and 2(b)2 show a threshold characteristic 1,000 hours after injecting a ferroelectric liquid crystal composition obtained by adding 0.3 wt% of Jeffamine (D230) as an aliphatic amine to ZLI-3654 into a cell. The cell gap is 2 μm. A mark 0 shows a maximum relative brightness when a voltage is applied, which represents a bulk response, and a mark X shows a relative brightness after scanning 1,000 lines of a series of measurement waveforms, which represents a memory response. In FIG. 2, the threshold characteristic, when injecting liquid crystal only, deteriorates after 1,000 hours, while the threshold characteristic, when adding Jeffamine, continues to be symmetric and acute even after 1,000 hours have passed. It is considered that as a result of ornamenting the orientation film surface with an amine, the polarity of the orientation film is increased and the interfacial condition between the liquid crystal and the orientation film is changed. It is also considered that with the amine existing among liquid crystal molecules, interactions between side surfaces of liquid crystal molecules are moderated. These effects would contribute to elimination of deterioration of the liquid crystal characteristics. An added amount of an amine may not be specifically limited, but, practically an amount of 0.01 to 5 wt% is preferable. However, if it is less than an appropriate amount, the above additive effects can not be obtained, thus resulting in a time-dependent deterioration of the characteristics. If it is more than a necessary amount, the specific resistance of the liquid crystal decreases, which tends to cause a twist, hence a specific resistance of a liquid crystal of $1 \times 10^{11}$ and more is preferable after an addition of the additive.

In Table 1, added amounts of additives to a liquid crystal and respective specific resistances are shown. In Table 1, in both 0.3 wt% of D400 and 0.5 wt% of DMP-30, specific resistances were below $1 \times 10^{11}$ and, thus, a time-dependent deterioration of the characteristics could not been prevented. No effect could be obtained, when using, as an additive, aromatic amines such as N, N'-diphenyl-p-phenylene diamine, triphenylamine, diphenylamine, methyl diphenylamine, aniline, dimethyl aniline, aminophenol, nitro aniline, anisidine, phenyl diethanolamine and 1,1'-(phenyl imino)-di-2-propanol. When using tertiary aliphatic amines such as tribenzyl amine, dimethyl benzyl amine, dimethyl benzyl amine, 2,4,6-trisdimethyl amino methyl phenol (DMP-30) and dimethyl aminol methyl phenol (DMP-10), no effect could be obtained, either.

EXAMPLES 2 to 7

When using the same liquid crystal cell as that used in Example 1 and adding amines shown in Table 2 as aliphatic amines, a symmetric and acute threshold characteristic was observed even after 1,000 hours.

EXAMPLES 8 and 9

When using an epoxy compound as an additive, the same effect was observed.

By adding epoxy compounds shown in Table 3, a symmetric and acute threshold characteristic was observed even after 1,000 hours. When using Epicoat 801, 807, 808, 815, 815X, 816, 819, 827, 828XA, 834 and 871, all of which are trade names or Yuka-Shell Epoxy, the same effect was observed.

TABLE 1

| Additive | Added amount wt % | Specific resistance Ω · cm |
| --- | --- | --- |
| Benzyl amine | 0.5 | $1.0 \times 10^{11}$ |
| Cyclohexylamine | 0.5 | $1.0 \times 10^{11}$ |
| Epicoat 828 | 0.3 | $1.5 \times 10^{11}$ |
| D400 | 0.3 | $3.0 \times 10^{10}$ |
|  | 0.1 | $1.2 \times 10^{11}$ |
| Methyl benzyl amine | 0.5 | $1.5 \times 10^{11}$ |
| DMP-30 | 0.5 | $5.0 \times 10^{9}$ |

TABLE 2

| Examples | Aliphatic amine | Structural formula | Added wt % |
| --- | --- | --- | --- |
| 2 | Jeffamine (D400) | 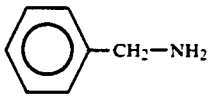 | 0.1 |
| 3 | Benzyl amine |  | 0.5 |

TABLE 2-continued

| Examples | Aliphatic amine | Structural formula | Added wt % |
|---|---|---|---|
| 4 | Benzyl ethanolamine | 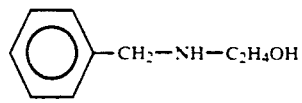 | 0.5 |
| 5 | Methyl benzyl amine | 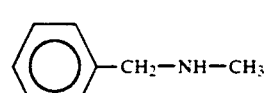 | 0.5 |
| 6 | Phenyl propyl amine | 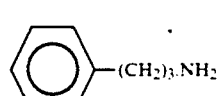 | 0.5 |
| 7 | Cyclohexylamine | 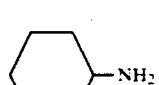 | 0.5 |

TABLE 3

| Embodiment | Structural formula | Added wt % |
|---|---|---|
| 8 |  | 0.3 |
| 9 |  | 0.1 |

What is claimed is:

1. A ferroelectric liquid crystal composition comprising a ferroelectric liquid crystal material, and an aliphatic amine shown by the following formula:

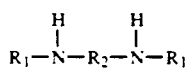

where each of $R_1$ and $R_{1'}$ is —H or a hydrocarbon radical, and $R_2$ is a hydrocarbon radical.

2. A ferroelectric liquid crystal composition according to claim 1, wherein, among radicals of $R_2$, one $CH_2$ radical or two or more $CH_2$ radicals which are not adjoining each other are substituted by at least one member selected from the group consisting of —O—, —CO—, —OCO— and —COO— radicals.

3. A ferroelectric liquid crystal composition according to claim 1, wherein the aliphatic amine is in the composition in an amount of 0.01 to 5 wt%.

4. A liquid crystal display using a ferroelectric liquid crystal composition according to claim 1.

5. A ferroelectric liquid crystal composition comprising a ferroelectric liquid crystal material, and an aliphatic amine shown by the following formula:

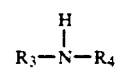

wherein $R_3$ is —H or $(CH_2)_n OH$ in which n is 1 or more, and $R_4$ is a hydrocarbon radical,
wherein, among radicals of $R_4$, one $CH_2$ radical or two or more $CH_2$ radicals which are not adjoining each other are substituted by at least one member selected from the group consisting of —O—, —CO—, —OCO—, and —COO— radicals.

6. A ferroelectric liquid crystal composition according to claim 5, wherein the aliphatic amine is in the composition in an amount of 0.01 to 5 wt%.

7. A liquid crystal display using a ferroelectric liquid crystal composition according to claim 5.

* * * * *